United States Patent [19]

Oda et al.

[11] Patent Number: 4,725,902

[45] Date of Patent: Feb. 16, 1988

[54] METHOD OF ERASING A MAGNETIC RECORDING TRACK AND APPARATUS THEREFOR

[75] Inventors: Kazuya Oda, Tokyo; Kiyotaka Kaneko; Izumi Miyake, both of Kawasaki, all of Japan

[73] Assignee: Fuji Photo Film Co., Ltd., Kanagawa, Japan

[21] Appl. No.: 890,523

[22] Filed: Jul. 30, 1986

[30] Foreign Application Priority Data

Aug. 2, 1985 [JP] Japan .................................. 60-169692
Nov. 19, 1985 [JP] Japan .................................. 60-257751

[51] Int. Cl.⁴ ........................ G11B 5/03; G11B 21/10
[52] U.S. Cl. ......................................... 360/66; 360/77
[58] Field of Search ........................... 360/66, 77, 78

[56] References Cited

U.S. PATENT DOCUMENTS 4,290,088 9/1981 Beecroft ................................. 360/66
4,644,421 2/1987 Miwa et al. ........................... 360/66

Primary Examiner—Vincent P. Canney
Attorney, Agent, or Firm—Lowe, Price, LeBlanc, Becker & Shur

[57] ABSTRACT

A method of erasing a magnetic recording on one designated track or on plural designated tracks on a magnetic recording medium bearing a plurality of tracks mutually adjacent one of which are spaced apart substantially equal distances includes moving a magnetic head in a direction orthogonal to the tracks, detecting a position of a track, on which a magnetic recording has been made, nearest an outermost track among the designated tracks, based on the strength of a signal read from the magnetic recording medium by the magnetic head, and erasing, by means of the magnetic head, a range decided using the detected position of tracks as a reference.

8 Claims, 11 Drawing Figures

METHOD OF ERASING A MAGNETIC RECORDING TRACK AND APPARATUS THEREFOR

BACKGROUND OF THE INVENTION

1. Field of the Invention

This invention relates to a method and apparatus for erasing a magnetic recording track. More specifically, the invention concerns the erasure of a magnetic disk or other magnetic recording medium on which still video pictures are magnetically recorded on a track-by-track basis, and more particularly pertains to a method and apparatus for erasing the recorded information one track at a time or over a range of designated tracks.

2. Description of the Prior Art

Electronic still camera systems have recently been developed. These systems combine an imaging device such as a solid state imaging element or image pickup tube with a recorder that employs an inexpensive rotating magnetic recording medium such as a magnetic disk of a comparatively large storage capacity as a recording medium and operate by electronically imaging a subject, recording a still picture of the subject on the rotating magnetic recording medium and reproducing the recorded picture by a separately provided television system or printer. A video magnetic recording system has also been realized in which a still picture recorded on a visible recording medium such as ordinary film or photographic paper is imaged and recorded on the above-described magnetic recording medium.

In an electronic still camera or video magnetic recording system it is sometimes desired to erase a video signal that has been recorded on a track of the magnetic recording medium and re-record the same or another video signal on this track. In many cases this requirement stems mainly from a recording failure not attributable to a flaw in the magnetic recording medium. Examples of such failures when using an electronic still camera include misfocusing or improper release of the camera shutter. In the case of a video magnetic recording system, failures include improper adjustment of the recorded video signal's white balance, color correction and color density correction. There are also occasions where it is desired to edit the pictures recorded on respective tracks.

When selectively erasing only a specific single track or a predetermined range covering a plurality of tracks, technical problems that require consideration include specifying the position of the track to be erased and setting the range to be erased.

A magnetic recording medium such as a magnetic disk tends to expand and contract somewhat with a change in ambient temperature. Since a video signal is recorded on such a medium with a positional precision on the micron order, the position of each track (the position at which a recording actually exists) shifts when the medium itself expands or contracts, even slightly, due to temperature. With the conventional method of erasing a magnetic recording, track position is detected based on the distance from the position of the origin of the magnetic recording medium and, for this reason, difficulty is encountered in positioning a magnetic head correctly on the desired track. In particular, if a track on which a video signal has been recorded in a high-temperature environment is to be erased in a low-temperature environment, erasure of a location other than that at which this video signal has been recorded is likely to occur. This is because the track position is displaced slightly away from the center of the medium due to medium expansion at the time of recording, and later approaches the center of the medium due to medium contraction at the time of erasure.

Erasure must be performed over a width greater than that at which a recording is made even if the center position of a track has been accurately determined. The reason is that a recorded location tends to meander somewhat, and crosstalk can occur if some information is left unerased. The latter is brought about when the remaining information mixes with information read from the neighboring track or with new information, which has been re-recorded on the same track, when this new information is read. Accordingly, to achieve erasure, it is necessary to use a magnetic head of large width or to provide a small magnetic head, referred to as a tunnel erase head, on both sides of an erase head, thus making necessary an erase magnetic head separate from a write (recording) magnetic head.

SUMMARY OF THE INVENTION

An object of the present invention is to provide a magnetic recording track erasure method and apparatus whereby a single track or a range of tracks to be erased can be accurately determined and erased.

Another object of the present invention is to provide a magnetic recording track erasure method and apparatus in which a recording head can also be used as an erase head.

According to the present invention, the foregoing objects are attained by providing a method of erasing a single designated track on a magnetic recording medium bearing a plurality of tracks mutually adjacent ones of which are spaced apart substantially equal distances, the method comprising steps of moving a magnetic head in a direction orthogonal to the tracks, detecting a position of at least one track adjacent to a designated track based on the strength of a signal read from the magnetic recording medium by the magnetic head, and erasing, by means of the magnetic head, a range of a predetermined width heading toward the designated track using the detected position of the at least one track as a reference.

If tracks exist adjacent to the designated track on both sides thereof, the method includes detecting the positions of these tracks on both sides of the designated track and erasing a range decided by these detected track positions.

If a magnetic recording on a plurality of tracks within a designated range is to be erased, the present invention is characterized by steps of moving a magnetic head in a direction orthogonal to the tracks, detecting a position of a track, on which a magnetic recording has been made, nearest each outermost track within the designated range heading inwardly or outwardly from each outermost track, based on the strength of a signal read from the magnetic recording medium by the magnetic head, and erasing, by means of the magnetic head, a range decided using the detected positions of the two tracks as a reference.

Erasure of a magnetic recording can be carried out by providing the magnetic head with a first erasure carrier wave having a frequency near a frequency band of signals recorded on the magnetic recording medium, and then providing the magnetic head with a second erasure carrier wave having a frequency higher than that of the first erasure carrier wave. Alternatively, erasure of the magnetic recording can be carried out by providing the magnetic head with an erasure carrier wave swept over frequencies higher than a frequency band possessed by signals recorded on the magnetic recording medium. Erasure of a magnetic recording in which the range to be erased extends over one or a plurality of determined tracks is performed by repeating erasure of a range narrower than the width of the magnetic head while successively changing the location of the magnetic head.

One specific characterizing feature of the erasing method according to the invention resides, in principle, in detecting not the tracks specified for the sake of designating an erasure range but the position of a track, on which a magnetic recording has already been made, adjacent to each specified track on its outer side (or nearest each specified track heading inwardly or outwardly from the specified track), and deciding the erasure range using the detected positions of the track as a reference. In principle, a range measured from a track position which is not a subject for erasure is the target to be erased. Therefore, it becomes possible to determine this range in such a manner that crosstalk with an adjacent track will not occur. Since the range to be erased is clearly defined, it is possible to move the magnetic head across this range to perform erasure, and a recording head can be used as is for erasing purposes, thus making it unnecessary to provide a special erase head of large width.

Another characterizing feature of the invention resides in reading information, which is actually recorded on the magnetic recording medium, by the magnetic head moved in a direction orthogonal to the magnetic recording tracks, and detecting the position at which the intensity of the read signal peaks, thereby determining the position of a track. Accordingly, even if the magnetic recording medium undergoes expansion and contraction due to heat, it is possible to recognize a portion of the medium on which a recording actually exists as a track accurately at all times.

These and other characterizing features of the present invention will become clear from a description of preferred embodiments with reference to the accompanying drawings.

DETAILED DESCRIPTION OF THE PREFERRED EMBODIMENT

The preferred embodiment described herein illustrates the method of the present invention applied to the aforementioned electronic still camera system or video magnetic recording system.

Magnetic disk format

Figure 1:
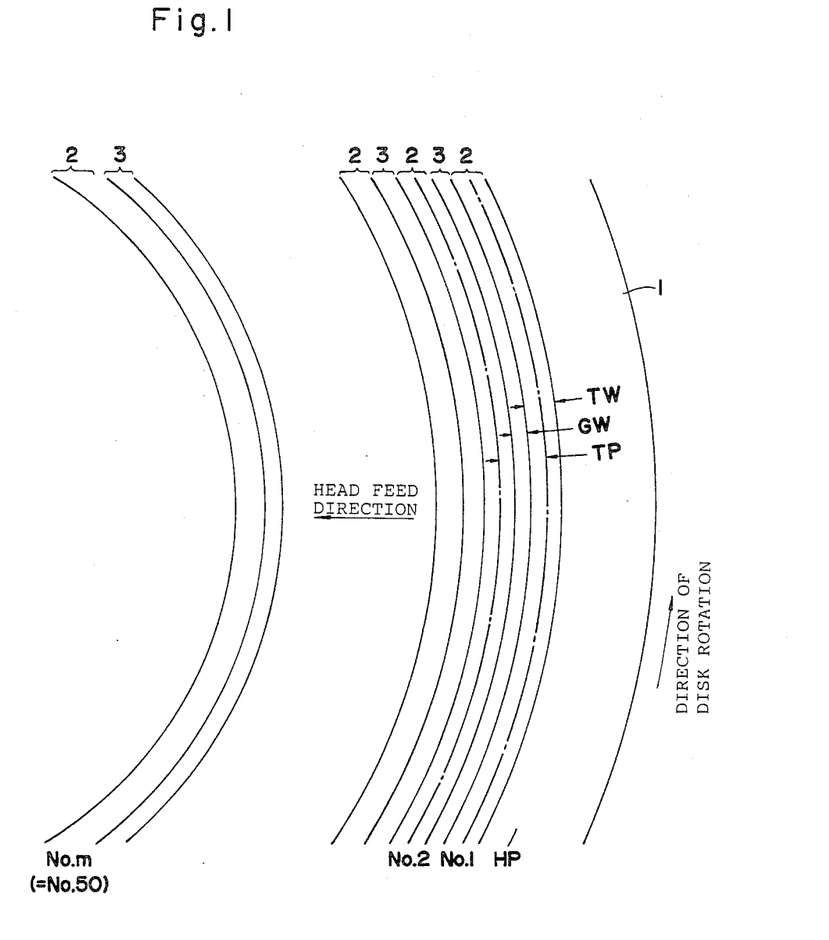
FIG. 1 is a plan view of a magnetic disk and shows recording patterns present on the magnetic disk.

FIG. 1 illustrates recording patterns on a magnetic disk used to magnetically record a frequency-modulated video signal in the abovementioned systems. The magnetic disk, shown at numeral 1, has m (50 in the illustrated embodiment) circular video signal tracks 2 disposed concentrically thereon. A guard band 3 is provided between mutually adjacent ones of the tracks 2. The tracks 2 are numbered consecutively from No. 1 to No. m starting from the outer side of the disk 1. In principle, a magnetic recording/playback head, described below, is fed radially of the magnetic disk 1 from its outer to its inner side. A home position HP, which serves as the origin whence the magnetic head is moved, is located at a position corresponding to a point on the outer side of track No. 1. The home position HP is detected by sensing the magnetic head by means of an appropriate sensor when the head arrives at the home position. Typical specifications for the magnetic disk 1 are e.g. a diameter of 50 mm, a track width TW of 60 $\mu$m, a guard band width GW of 40 $\mu$m, and a track pitch TP of 100 $\mu$m. In general, a frequency-modulated video signal of one field is recorded on one track.

System configuration

Figure 2:
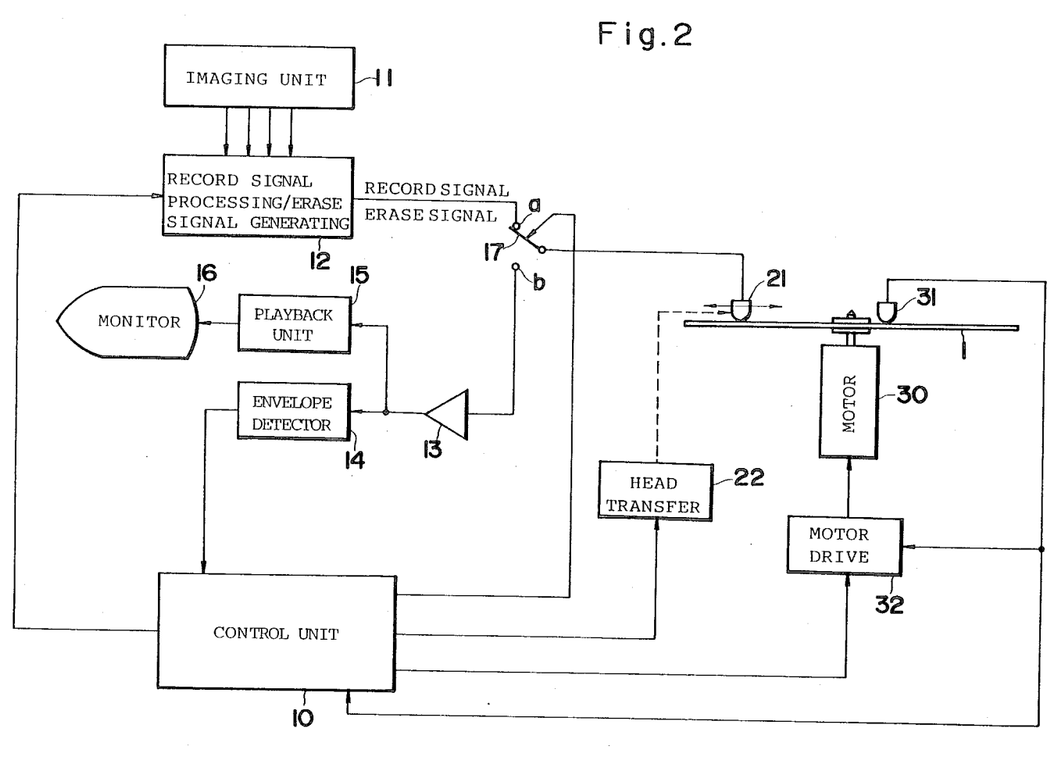
FIG. 2 is a block diagram and partial structural view schematically illustrating the construction of an apparatus for practicing the method of the invention.

FIG. 2 illustrates an example of the configuration of an electronic camera system or a video magnetic recording system.

The magnetic disk 1 is detachably loaded at its center on the spindle of a disk rotating drive motor 30. The magnetic disk 1 has a central portion near which there is arranged a phase generator 31 in close proximity to the disk core. The phase generator 31 detects a timing mark (e.g. a magnetic body or leakage flux from a permanent magnet which is used for chucking) provided on the core of the magnetic disk 1 and outputs a single electrical pulse each time the magnetic disk 1 makes one full revolution. These pulses are applied as a phase synchronizing signal to a motor drive control circuit 32 and a control unit 10. The motor drive control circuit 32 starts and stops rotation of the motor 30 and control the rotational speed and phase of the motor 30 based on a command from the control unit 10 and the phase synchronizing signal from the generator 31. When the motor 30 has been turned on, it rotates at a predetermined phase and at a predetermined, constant speed which, in the illustrated embodiment, is 3600 rpm.

A head transfer mechanism 22 is provided for supporting the magnetic head 21 in such a manner that the head 21 may travel freely radially of the magnetic disk 1 while in contact with the disk surface, and for transferring the head 21 radially of the disk. The mechanism 22 includes a stepping motor (not shown) for feeding the magnetic head 21 a distance proportional to the angle through which the rotary shaft of the stepping motor is rotated. By way of example, for each shift pulse applied to the stepping motor, the motor rotates through about 15°, whereby the magnetic head 21 is shifted by about 4.2 $\mu$m. Accordingly, the traveling distance of the magnetic head 21 and the distance from the home position HP to the position of the magnetic head 21 can be controlled with great accuracy.

An imaging unit 11 includes e.g. an image pickup tube or a solid-state electronic image scanner device and outputs raster scanning vertical and horizontal synchronizing signals, a subject luminance signal and a color difference signal (chrominance signal). The luminance signal and color difference signal are each used to frequency modulate a carrier wave of a predetermined center frequency. These frequency-modulated waves following combination are outputted as a record signal by a record signal processing/erase signal generating circuit 12. In a mode for recording a still picture on the magnetic disk, the record signal is delivered to the recording head 21 via a changeover switch 17.

In an erase mode, the circuit 12 outputs an erase carrier wave which likewise is delivered to the magnetic head 21 via the switch 17. The erase carrier wave and erasing method will be described below.

In the blayback mode, the switch 17 is changed over from an a side to a b side so that signal read by the recording head 21 (namely a still video signal read from the recording disk) is delivered to a playback amplifier 13, the output whereof is applied to a playback circuit 15 and an envelope detector circuit 14. The playback circuit 15 demodulates the read signal and applies the demodulated signal to a video monitor 16, which displays the signal as a still picture.

The envelope detector circuit 14 is for detecting the envelope of the signal read by magnetic head 12. The output of circuit 14 is mainly used for tracking control. Tracking control refers to detecting the center position of a track on which some signal has been recorded. When the magnetic head 21 travels across a track and this track has been recorded on, the output of the envelope detector circuit 14 grows larger in magnitude with the travel of the magnetic head 21, peaks at a certain position and then gradually diminishes with further travel of the magnetic head. When the output of the envelope detector circuit 14 peaks, the magnetic head 21 is situated at the center of a track at such time. This output signal is applied to the control unit 10, by which movement of the magnetic head 21 is controlled via the head transfer mechanism 22.

The control unit 10, in addition to the aforementioned control of the various circuits, executes overall control inclusive of mode changeover, changeover of switch 17 and the supply of clock pulses to the various circuits. Preferably, the control unit 10 consists of a microprocessor, an internal memory and the necessary interfaces.

Erasure processing (one track)

The frequency band of the video signals recorded on the magnetic disk 1 covers a very wide region of from 0 to 10 MHz. The applicant has developed several methods of erasing video signals over such a wide band. One includes steps of erasing a recorded signal by providing the magnetic head 21 with a first erasure carrier wave having a frequency within or in the vicinity of (e.g. 10–12 MHz) the frequency band of the recorded signal, and thereafter erasing the first erasure carrier wave signal by a second erasure carrier wave having a frequency (e.g. 14–20 MHz) higher than that of the first erasure carrier wave. This method is described in the specification of Japanese Patent Application No. 60-146787. Another method entails sweeping an erasure carrier wave, which is applied to the magnetic head 21, continuously over frequencies ranging from e.g. 4.5–20 MHz in a prescribed period of time (e.g. 1.5–2 sec), as disclosed in the specification of Japanese Patent Application No. 60-45748. According to the present invention, either of these methods can be employed, and it goes without saying that other known methods of erasure can also be used herein. The signal processor/generator 12 shown in FIG. 2 generates the aforementioned erasure carrier waves under the control of the control unit 10.

Figure 3A:
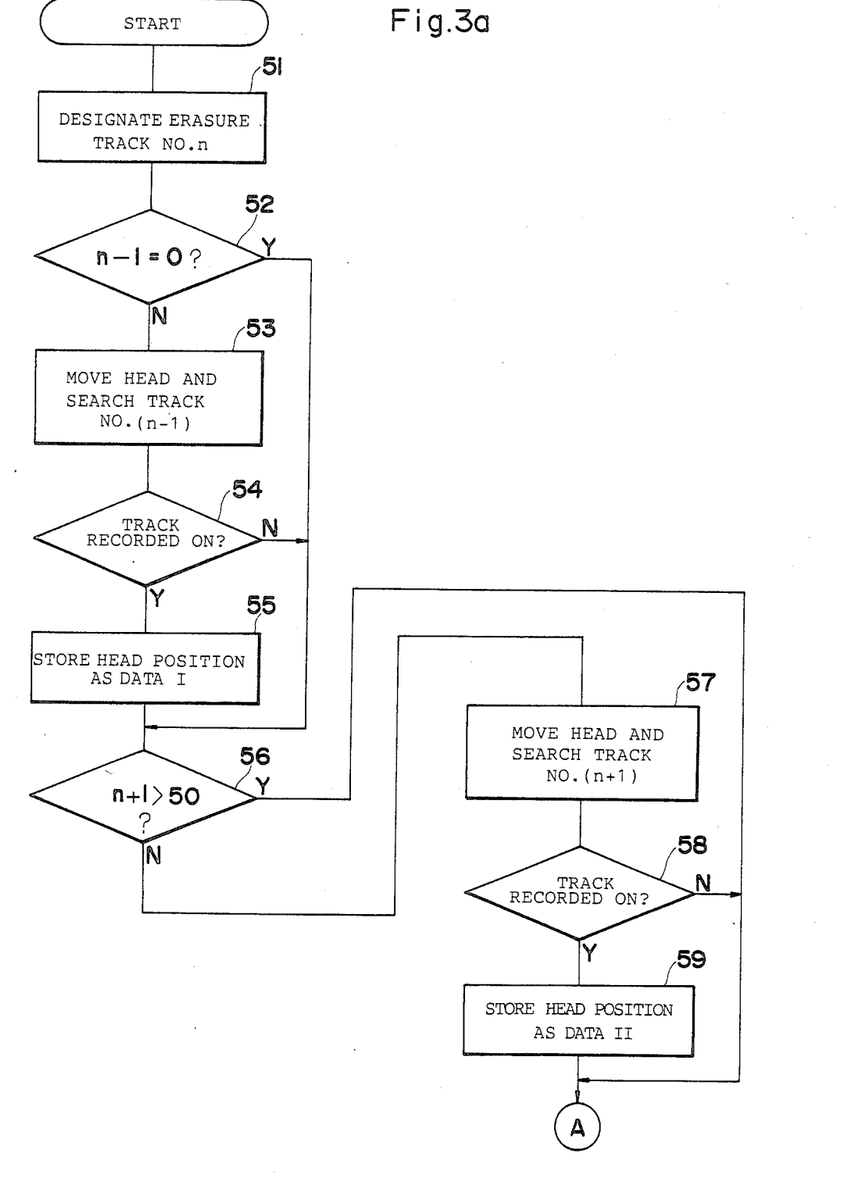
FIGS. 3a and 3b are flowcharts illustrating processing for erasing a single track on a magnetic disk.
Figure 3B:
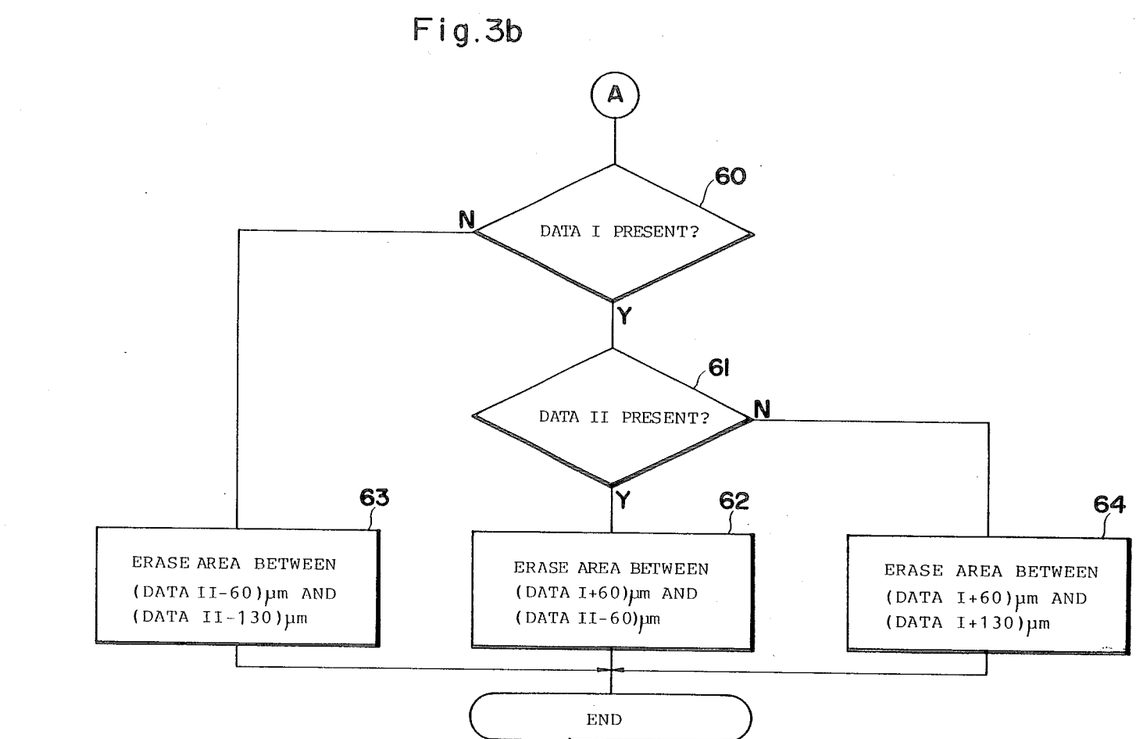

Processing for erasing a desired single track executed by the control unit 10 is illustrated in the flowcharts of FIGS. 3a, 3b. In the illustrated embodiment, the width of the magnetic head 21 is assumed to be 60 $\mu$m. The track width, track pitch and guard band width have the numerical values set forth above.

In the first step 51 of the flowchart shown in FIG. 3a, an erase command and the track number n of a track desired to be erased are fed into the control unit 10 from a keyboard or other input device, not shown. In order to read the positions of tracks adjacent to the designated track number n, the changeover switch 17 is changed over to the side b. In addition, the magnetic disk 1 is rotated at the predetermined rotational speed.

Next, a step 52 calls for a determination as to whether the entered track number n satisfies the condition $n-1=0$, namely whether $n=1$ holds. If $n=1$ is determined to hold, this means that a track of number $n-1$ does not exist; hence, the processing of steps 53–55 is skipped. If the track number is not No. 1, then the program proceeds to a step 53, where the magnetic head 21 is moved radially of the disk 1 from the home position HP, or from an appropriate position, toward the center of the disk 1 up to track number $(n-1)$ to search for this track.

As mentioned above, the amount of travel of the magnetic head 21 can be controlled by the angle through which the stepping motor in the head transfer mechanism 22 is rotated. Since the standard distance from the home position HP to the track number $(n-1)$ (e.g. a distance which does not take into account temperature-induced expansion and contraction of the magnetic disk 1) is known, the magnetic head 21 is moved this distance first. The abovementioned tracking control is then performed. The signal read from the magnetic disk 1 by the magnetic head 21 enters the envelope detector circuit 14 via the amplifier 13. After the magnetic head 21 has been fed the abovementioned standard distance, the control unit 10 moves the head 21 over a prescribed range to search for the center position of track number $(n-1)$. If a peak value above a certain threshold level is found, this means that some signal has been recorded on track number $(n-1)$, giving a YES answer at a step 54. If a signal having a peak value above the threshold level is not produced by the envelope detector circuit 14 even though the magnetic head 21 traverses the prescribed range, then this means that no signal whatsoever has been recorded on track number $(n-1)$, giving a NO answer at the step 54.

When a YES answer is obtained at the step 54, the distance from the home position HP is measured based on the number of pulses which were applied to the stepping motor of head transfer mechanism 22 to move the head 21 across this distance. In this way the position of the magnetic head 21 is determined. The measured value is stored as data I in the internal memory of control unit 10 at a step 55. Thus, the data I represents the distance from the home position HP to the center of track number $(n-1)$.

When a NO answer is received at the step 54, the processing of step 55 is skipped.

Next, a step 56 calls for a determination as to whether the track number n is 50, namely whether the designated track is the innermost track of magnetic disk 1. If the answer is YES, this means that a track number $(n+1)$ does not exist, so that the processing of steps 57-59 is skipped. If (n+1) is determined to be less than 50 at the step 56, the magnetic head 21 is moved further inward to search for the track whose number is (n+1) at a step 57, just as in the case described above. It is then decided at a step 58 whether the track at number (n+1) has been recorded on. If a recording has not yet been made on this track, the processing of a step 59 is skipped; if the track has been recorded on, then the position of the center of track number (n+1) (the distance from the home position HP) is stored in memory as data II at the step 59.

If it is determined through the above processing that the designated track number n satisfies the condition $2 \leq n \leq 49$ and, moreover, that tracks on which recordings have already been made are located at the positions immediately adjacent the designated track on both sides thereof, then this means that the center positions of the tracks on both sides of the designated track, namely the tracks whose track numbers are (n−1) and (n+1), will have been obtained as the data I and II. Further, if the center position of the track (No. 2) on the inner side of track number 1 is detected as the data II and the center position of the track (No. 49) on the outer side of track number 50 is detected as the data I, so that a track on which a recording has been made exists on only one side, the position of this track is detected as data I or II and stored in memory.

Next, the program proceeds to processing for erasing the designated track. To this end, the switch 17 is changed over to the a side and a mode changeover is made within the circuit 12 so that this circuit may output the erasure carrier wave and apply it to the magnetic head 21. Rotation of the magnetic disk 1 continues.

Figure 4A:
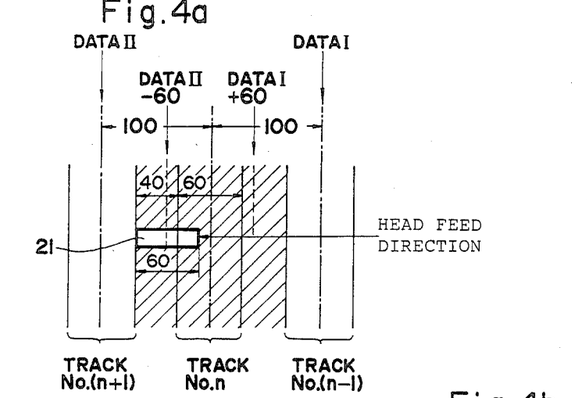
FIGS. 4a through 4c are views illustrating an area erased by the erasure processing shown in FIGS. 3a and 3b.

It is determined at steps 60, 61 in FIG. 3b whether both the data I, II are present. If the answers obtained at both steps are YES, the center of the magnetic head 21 is set first at a position indicated by (data I+60) μm and the erasure carrier wave is applied to the magnetic head 21 to begin erasure. The magnetic head 21 is fed slowly toward the inner side of the magnetic disk 1 in the radial direction until the center of the head arrives at a position indicated by (data II−60) μm. In the meantime, since the magnetic disk 1 continues to rotate, the shaded portion shown in FIG. 4a is scanned relatively by the magnetic head 21, whereby the shaded portion is magnetically erased. This is performed at step 62 in the flowchart of FIG. 3b. In a case where the adopted method of erasure is the one in which the first and second erasure carrier waves are applied, the foregoing processing is repeated for each of these two carrier waves. In the method of erasure entailing sweeping of the erasure carrier wave, it will suffice to repeat sweeping of the frequencies while the magnetic head 21 is moved radially of the disk 1 continuously or intermittently.

In the illustrated embodiment, as will be understood from FIG. 4a, erasure is applied over a range extending from the guard band on one side of the designated track to the guard band on the other side of the designated track. It goes without saying that the numerical value of 60 μm added to data I or subtracted from data II can be decided at will depending upon the width of the magnetic head 21, track width, guard band width and the like.

If the data I are not present (NO at step 60), the data II should have been stored in memory. Therefore, as shown in FIG. 4b, erasure is performed (step 63) over a width corresponding to a head center-to-center interval of 70 μm by moving the magnetic head 21 in such a manner that its center travels from the position (data II−130) to the position (data II−60) μm.

Figure 4B:
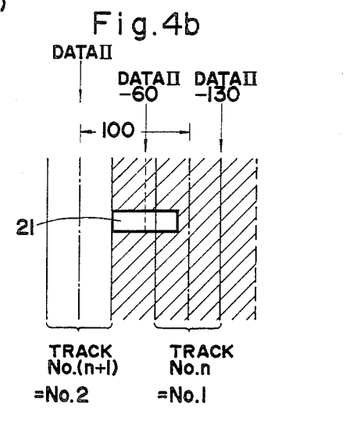
Figure 4C:
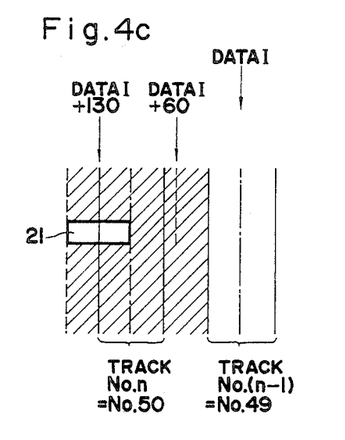

If the data I have been stored in memory but the data II have not, giving a NO answer at the step 61, then, as illustrated in FIG. 4c, erasure is performed (step 64) over a range in which the magnetic head 21 is moved in such a manner that its center travels from the position (data I+60) μm to the position (data I+130) μm.

In FIGS. 4b, 4c, track numbers 1 and 50 are illustrated as typical examples wherein data I (FIG. 4b) and data II (FIG. 4c) do not exist.

By always moving the magnetic head 21 in one direction, namely from the outer periphery of the magnetic disk 1 toward the center of the disk, it becomes possible to position the magnetic head accurately at all times even if some backlash develops in the magnetic head transfer mechanism 22.

Erasure processing (plural tracks)

Described next will be processing for dealing with a case where a range over which a plurality of tracks are to be erased is designated. This processing includes the processing described above for erasing one track.

The range to be erased is designated by specifying the numbers of two tracks on the two outermost sides of the range (namely the outermost side and innermost side in FIG. 1). Let N represent the track number on the side of the range where erasure starts, and let M represent the track number on the side of the range where erasure ends. The condition N<M holds and, in principle, a plurality of tracks exist within the range.

Figure 5A:
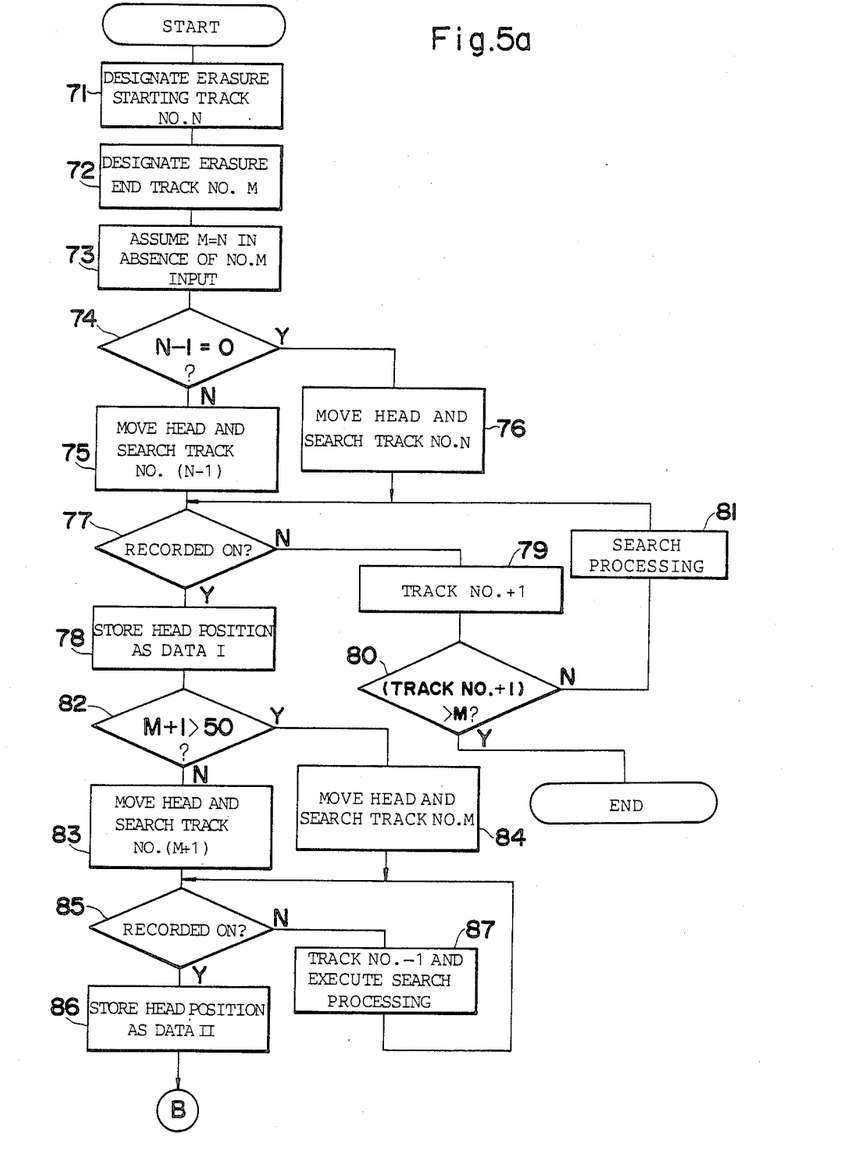
FIGS. 5a and 5b are flowcharts illustrating processing for erasure covering a specified plurality of tracks.
Figure 5B:
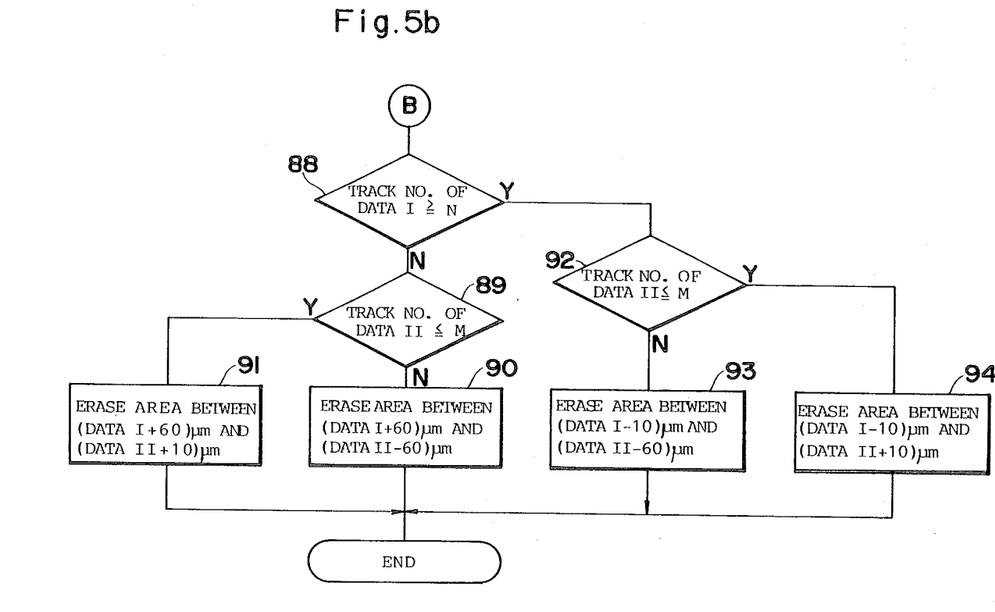

With reference now to the flowcharts of FIGS. 5a, 5b, an erase command and the two track numbers N, M indicating the range desired to be erased are fed into the control unit 10 from the keyboard or other input device, not shown (steps 71, 72). If one of the two track numbers, say No. M, is not inputted, this will be understood as meaning N=M (step 73), in which case only one track will be erased.

In order to read the position of a recorded track adjacent the designated track number N on the outer side thereof and the position of a recorded track adjacent the designated track number M on the inner side thereof, the changeover switch 17 is changed over to the side b. In addition, the magnetic disk 1 is rotated at the predetermined rotational speed.

Next, a step 74 calls for a determination as to whether the entered track number N on the erasure starting side satisfies the condition N−1=0, namely whether N=1 holds. If N=1 is determined to hold, this means that a track of number (N−1) does not exist. As a result, the program proceeds to a step 76 in order that special processing, described below, may be executed. If the track number is not No. 1, then the program proceeds to a step 75, where the magnetic head 21 is moved radially of the disk 1 from the home position HP toward the center of the disk 1 up to track number (N−1) to search for this track. Next, at a step 77, it is decided based on an output from the envelope detector circuit 14 whether a signal has been recorded on track number (N−1). If the output indicates that a signal has been recorded on this track, then the center position of track number (N−1) is stored in the internal memory of control unit 10 as data I at a step 78. The data I represents the distance from the home position HP to the center of track number (N−1). This track number (N−1) also is stored in memory.

If the condition N=1 is found to hold for track number N on the erasure starting side (YES at the step 74), then the position of track number N is search out at the step 76. If it is found at the step 77 that a signal has been recorded on track number 1 (N=1), then this position is stored in memory as data I at a step 78.

If it is decided in the track search processing of steps 75, 76 that a video signal has not been recorded on the track (NO at step 77), then 1 is added (step 79) to the track number which is the object of the search to make the track with the next larger number the object of the search (step 81). If it is found at the step 77 that a video signal has been recorded on this new track, then the position of this track, as well as the track number, is stored in memory as data I at the step 78.

If the foregoing processing is repeated as the track number is successively increased and the track number becomes larger than the track number M at the erasure end point (YES at a step 80), this means that a video signal has not been recorded on any of the tracks in the designated range (track numbers N through M). Accordingly, erasure processing is unnecessary and this series of process steps ends.

Next, if a YES answer is obtained at the step 77, the program proceeds to search processing for the track position on the erasure end point side.

A step 82, which corresponds to the step 56 in FIG. 3a, calls for a determination as to whether the track number M is 50, namely whether the designated track is the innermost track of magnetic disk 1. If the answer is YES, this means that a track number (M+1) does not exist, so that the program proceeds to a step 84 for special processing, described below. If (M+1) is determined to be less than 50 at the step 82, the magnetic head 21 is moved further inward to search for the track whose number is (M+1) at a step 83, just as in the case described above. It is then decided at a step 85 whether the track at number (M+1) has been recorded on. If this track has been recorded on, then the position of the center of track number (M+1) (the distance from the home position HP) is stored in memory as data II at a step 86.

For the condition M=50, the position of track number 50 is searched out and, if this track has been recorded on, its position is stored in memory as data II together with the track number M of this track (steps 84, 85, 86).

If track number (M+1) or M has not been recorded on, then 1 is substracted from the track number to make the immediately preceding track the object of processing. For this track, the search for its position, the determination as to whether or not it has been recorded on and, if so, the memorizing of the position and the track number, are repeated. Accordingly, processing corresponding to step 80 is unnecessary. The reason for this is that as long as a NO answer is obtained at the step 80, at least one track on which a recording has been made will always exist in the range of track number N through M.

By way of the above processing, the center positions of two outermost tracks, on which recordings have been made, between track number (N−1) and track number (M+1) (a case is possible in which the two tracks overlap one track) are obtained and stored as data I, II, and the track numbers of these tracks also are stored in memory.

This is followed by processing for erasing the designated range of track numbers N through M. The switch 17 is changed over to the a side and a mode changeover is made within the circuit 12 so that this circuit may output the erasure carrier wave and apply it to the magnetic head 21. Rotation of the magnetic disk 1 continues.

Figure 6A:
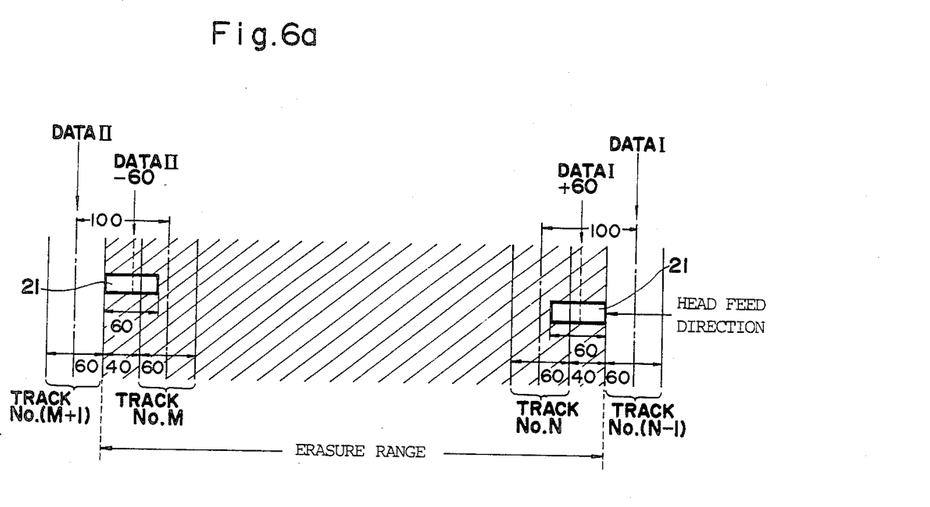
FIGS. 6a and 6b are views illustrating an area erased by the erasure processing shown in FIGS. 5a and 5b.

A case where the track number of the center position data I stored in memory is less than N, namely where the track number is (N−1) (NO at step a 88), and, moreover, where the track number of data II is larger than M, namely where the track number is (M+1) (NO at a step 89), is the most common. In this case, the center of the magnetic head 21 is set first at a position indicated by (data I+60) $\mu$m, as shown in FIG. 6a, the erasure carrier wave is applied to the magnetic head 21 to begin erasure. When erasure effected by the magnetic head 21 at this position is completed, the head 21 is then moved toward the center of the magnetic disk 1 a distance less than the width of the head 21, e.g. 50 $\mu$m, and erasure is again performed at this position in the same manner. While the magnetic head 21 is thus moved intermittently at fixed intervals, erasure is carried out thoroughly over the erasure range until the center position of the magnetic head 21 arrives at a position (data II−60) (step 90). In a case where the center position of magnetic head 21 surpasses position (data II−60) $\mu$m by moving the head 21 50 $\mu$m at a time, the position (data II−60) $\mu$m takes precedence and, in effecting positioning for the final erasure, the magnetic head 21 is so positioned that its center is brought to the position (data II−60). Erasure of the range indicated by the shaded portion in FIG. 6a is thus carried out. In a case where the adopted method of erasure is the one in which the first and second erasure carrier waves are applied, the foregoing processing is repeated for each of these two carrier waves. It will suffice to move the magnetic head 21 slowly toward the inner side of the magnetic disk 1 radially thereof until the center of the head arrives at the position of (data II−60) $\mu$m from the position of (data I+60) $\mu$m. In the meantime, since the disk 1 continues to rotate, the shaded portion shown in FIG. 6a is scanned relatively by the magnetic head 21, whereby the shaded portion is magnetically erased.

As will be understood from FIG. 6a, erasure is applied over a range extending from the guard band on the outer side of one designated track to the guard band on the outer side of the other designated track. It goes without saying that the numerical value of 60 $\mu$m added to data I or subtracted from data II can be decided at will depending upon the width of the magnetic head 21, track width, guard band width and the like.

Figure 6B:
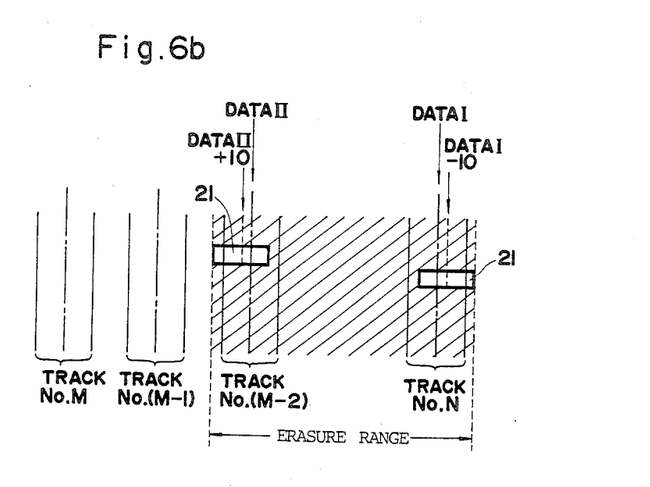

In the most extreme case, the track number of data I is equal to or greater than N (YES at step 88) and the track number of data II is equal to or less than M (YES at a step 92). In this case, erasure is performed by moving the center of the magnetic disk 21 from the position (data I−10) $\mu$m to the position (data II+10) $\mu$m (step 94), as shown in FIG. 6b. The value of 10 $\mu$m is decided upon taking backlash in the magnetic head transfer mechanism 22 into consideration, but it goes without saying that any value can be adopted.

FIG. 6b illustrates a case where track number (N−1) and track numbers (M+1) through (M−1) have not been recorded on. As indicated by the shaded portion, erasure is performed over a range extending from a point 10 $\mu$m on the outer side of track number N to a point 10 $\mu$m on the outer side (the inner side on the magnetic disk 1) of track number (M−2).

In a case where the track number of data I is (N−1) and the track number of data II is equal to or less than M, erasure is carried out over a range (data I+60) μm to (data II+10) μm in terms of the distance traversed by the center of magnetic head 21 (step 91). In a case where the track number of data I is equal to or greater than N and the track number of data II is (M+1), erasure is performed over a range (data I−10) μm (data II−60) μm (step 93).

In the illustrated embodiment described above, tracks which have been recorded on are searched by heading inwardly of the designated erasure range in a case where track number (N−1) or track number (M+1) has not been recorded on (steps 79, 81, 87). However, it can be so arranged that tracks which have been recorded on can be searched by heading outwardly of the designated erasure range. Though the erased range will widen in such case, only the erasure step 90 among the erasure steps 90, 91, 93, 94 need be adopted, and the decision processing of steps 88, 89, 92 will no longer be necessary.

As many apparently widely different embodiments of the present invention can be made without departing from the spirit and scope thereof, it is to be understood that the invention is not limited to the specific embodiments thereof except as defined in the appended claims.

What we claim is:

1. A method of erasing a magnetic recording on a designated track on a magnetic recording medium bearing a plurality of tracks mutually adjacent ones of which are spaced apart substantially equal distances, the method comprising steps of:
    moving a magnetic head in a direction orthogonal to the tracks;
    detecting a position of at least one track adjacent to a designated track based on the strength of a signal read from the magnetic recording medium by the magnetic head; and
    erasing, by means of the magnetic head, a range of a predetermined width heading toward the designated track using the detected position of said at least one track as a reference.

2. The method as defined in claim 1, wherein if a track exists adjacent to the designated track on both sides thereof, the method includes detecting positions of these tracks on both sides of the designated track and erasing a range decided by these detected track positions.

3. The method as defined in claim 1, wherein a recording in the range of said predetermined width is erased by providing the magnetic head with a first erasure carrier wave having a frequency near a frequency band of signals recorded on the magnetic recording medium, and then providing the magnetic head with a second erasure carrier wave having a frequency higher than that of the first erasure carrier wave.

4. The method as defined in claim 1, wherein a recording in the range of said predetermined width is erased by providing the magnetic head with an erasure carrier wave swept over frequencies higher than a frequency band possessed by signals recorded on the magnetic recording medium.

5. A method of erasing a magnetic recording on tracks within a designated range on a magnetic recording medium bearing a plurality of tracks mutually adjacent ones of which are spaced apart substantially equal distances, the method comprising steps of:
    moving a magnetic head in a direction orthogonal to the tracks;
    detecting a position of a track, on which a magnetic recording has been made, nearest each outermost track within the designated range heading inwardly or outwardly from said each outermost track, based on the strength of a signal read from the magnetic recording medium by the magnetic head; and
    erasing, by means of the magnetic head, a range decided using the detected positions of the two tracks as a reference.

6. The method as defined in claim 5, wherein a recording in said range is erased by providing the magnetic head with a first erasure carrier wave having a frequency near a frequency band of signals recorded on the magnetic recording medium, and then providing the magnetic head with a second erasure carrier wave having a frequency higher than that of the first erasure carrier wave.

7. The method as defined in claim 5, wherein a recording in said range is erased by providing the magnetic head with an erasure carrier wave swept over frequencies higher than a frequency band possessed by signals recorded on the magnetic recording medium.

8. An apparatus for erasing a magnetic recording on one designated track or on a plurality of designated tracks on a magnetic recording medium bearing a plurality of tracks mutually adjacent ones of which are spaced apart substantially equal distances, said apparatus comprising:
    magnetic head transfer means for moving a magnetic head in a direction orthogonal to the tracks;
    envelope detecting means for detecting an envelope of a signal read from the magnetic recording medium by the magnetic head;
    means for searching out a track, on which a recording has been made, nearest a designated track heading inwardly or outwardly from said track, based on the strength of the envelope detected by said envelope detecting means, while the magnetic head is being moved by said magnetic head transfer means;
    erasure signal generating means for generating an erasure signal; and
    erasure control means for controlling said magnetic head transfer means in such a manner that the magnetic head is moved across a range of a predetermined width heading toward the designated track, using the position of the searched track on which a recording has been made, while the erasure signal generated by said erasure signal generating means is applied to the magnetic head.

* * * * *